United States Patent
Longdill et al.

(10) Patent No.: US 7,410,396 B2
(45) Date of Patent: Aug. 12, 2008

(54) AMPHIBIOUS VEHICLE TRANSMISSION

(75) Inventors: Simon James Longdill, Auckland (NZ); Hans Weekers, Auckland (NZ); Stephen John Briggs, Auckland (NZ)

(73) Assignee: Gibbs Technologies Ltd, Warwickshire (GB)

( * ) Notice: Subject to any disclaimer, the term of this patent is extended or adjusted under 35 U.S.C. 154(b) by 0 days.

(21) Appl. No.: 11/255,776

(22) Filed: Oct. 21, 2005

(65) Prior Publication Data

US 2006/0172628 A1 Aug. 3, 2006

(30) Foreign Application Priority Data

Oct. 22, 2004 (GB) ................. 0423517.2

(51) Int. Cl.
*B60F 3/00* (2006.01)
*B63H 19/08* (2006.01)

(52) U.S. Cl. ................ 440/12.54; 440/12.5; 440/12.51; 440/12.52

(58) Field of Classification Search ................ 440/12.5, 440/12.54, 12.59, 75, 12.51, 12.52; 114/55.5, 114/344
See application file for complete search history.

(56) References Cited

U.S. PATENT DOCUMENTS

| 3,280,785 | A | | 10/1966 | Mycroft |
| 3,903,831 | A | | 9/1975 | Bartlett et al. |
| 3,941,074 | A | * | 3/1976 | Millerbernd ................ 114/344 |
| 4,958,584 | A | * | 9/1990 | Williamson .............. 440/12.52 |
| 5,562,066 | A | | 10/1996 | Gere et al. |
| 5,590,617 | A | * | 1/1997 | Gere et al. .............. 440/12.51 |
| 5,687,669 | A | | 11/1997 | Engler |
| 6,575,796 | B1 | | 6/2003 | McDowell |
| 2004/0014372 | A1 | | 1/2004 | Gibbs |
| 2004/0112661 | A1 | * | 6/2004 | Royle .......................... 180/209 |
| 2005/0003715 | A1 | * | 1/2005 | Hewitt ........................ 440/12.5 |
| 2005/0034911 | A1 | * | 2/2005 | Darby .......................... 180/209 |
| 2005/0101199 | A1 | * | 5/2005 | Gibbs ........................ 440/12.5 |
| 2006/0183384 | A1 | | 8/2006 | Longdill |

FOREIGN PATENT DOCUMENTS

| EP | 970825 A2 | 1/2000 |
| GB | 2419332 | 4/2006 |
| GB | 2425511 A | 11/2006 |
| WO | 02/07999 A1 | 1/2002 |
| WO | 02/14092 A1 | 2/2002 |
| WO | 03/037663 A1 | 5/2003 |
| WO | 2004/103741 A1 | 12/2004 |

* cited by examiner

*Primary Examiner*—Jesús D. Sotelo
*Assistant Examiner*—Daniel V Venne
(74) *Attorney, Agent, or Firm*—Fulwider Patton LLP

(57) ABSTRACT

An amphibious vehicle has retractable road wheels to allow planing over water. Power to the road wheels is disconnected automatically as the wheels are retracted. This may be achieved through a cable attached to a suspension rocker arm to disconnect a dog clutch attached to the input shaft of a differential as the wheels are retracted; and vice versa. The system may be fitted to a steered axle or to any suitable retractable suspension system.

6 Claims, 8 Drawing Sheets

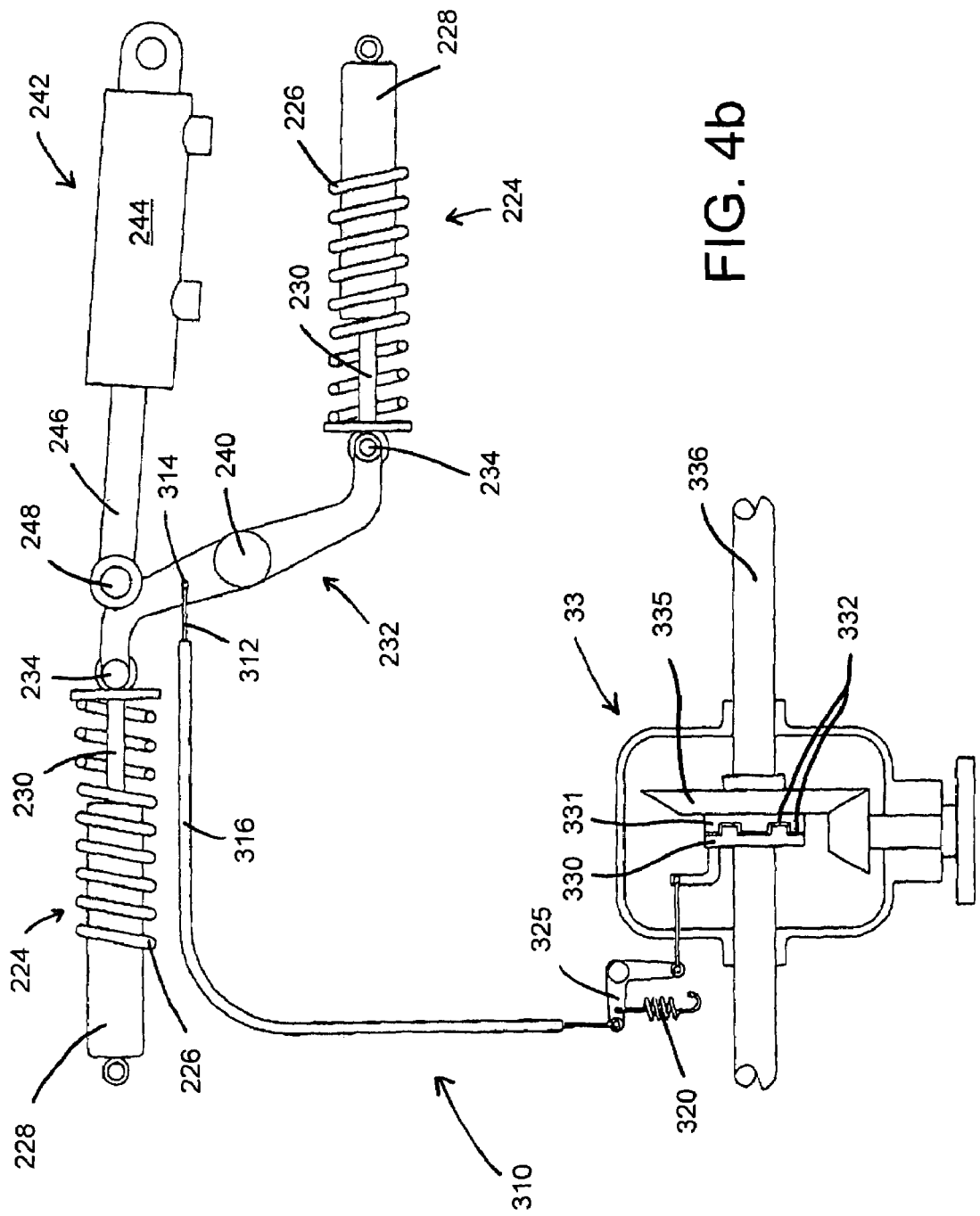

AMPHIBIOUS VEHICLE TRANSMISSION

CROSS-REFERENCES TO RELATED APPLICATIONS

This application claims priority from Great Britain Application Serial No. 0423517.2, filed Oct. 22, 2004.

BACKGROUND OF THE INVENTION

The present invention relates to transmission arrangements for amphibious vehicles, and in particular to control aspects thereof.

It is known for amphibious vehicles to have road wheels which can be retracted above the water line for use of the vehicle on water. This has the advantage of reducing hydrodynamic drag; particularly where the vehicle is designed to plane over the surface of the water, as such vehicles travel faster than displacement vehicles.

Where such wheel retraction systems are fitted, and the road drive and marine drive are driven in parallel, for example as disclosed in the applicant's co-pending application published as WO 02/07999, it is preferable to disconnect road drive on water. An example of road drive disconnection is disclosed in WO 02/14092, also of the present applicant. In this disclosure, a decoupler is provided in each wheel driveshaft. Such decouplers have many virtues, but light weight and simplicity are not among them.

SUMMARY OF THE INVENTION

It is advantageous if a single decoupler can be arranged to decouple drive to both wheels. This could be achieved by situating the single decoupler, for example, on the input driveshaft of the differential, where a single driven axle is provided. However, the location of the decoupler is not a solution to the problem of excess weight and complexity; the decoupler still needs to be activated.

Since there are a number of adjustments to be made to an amphibious vehicle during mode change on entry into or egress from water, it is preferable to reduce as far as possible the number of tasks that have to be effected directly by the driver. This helps simplify control of the vehicle at a critical time, one which is not necessarily intuitive to the novice amphibian driver. Accordingly, the present invention provides for automatic decoupling of road drive when the wheels are retracted during mode change from land mode to marine mode and for automatic coupling of road drive when the wheels are protracted during mode change from marine mode to land mode.

In a first aspect, the present invention provides an amphibious vehicle comprising:
 a prime mover;
 land propulsion means;
 marine propulsion means;
 transmission means for transmitting power generated by the prime mover to the land and/or marine propulsion means; and
 retractable suspension means capable of retracting and protracting the land propulsion means, wherein:
 the land propulsion means is automatically decoupled by the transmission means when retracted by the retractable suspension means.

In a further aspect the amphibious vehicle comprises a body; a power train comprising a prime mover, a road transmission, and a marine transmission; and a suspension capable of retracting road wheels; where the road transmission is decoupled automatically as the road wheels are retracted.

The road wheels may drive at least one tracked drive.

The road transmission may be decoupled at a differential input.

The decoupling means may be a dog clutch.

The decoupling means may be mechanically linked to the retractable suspension; particularly by a push-pull cable.

A spring return means may be fitted to the actuator for the decoupling means.

These and other features and advantages of the present invention will become apparent from the following detailed description of preferred embodiments which, taken in conjunction with the accompanying drawings, illustrate by way of example the principles of the invention.

BRIEF DESCRIPTION OF THE DRAWINGS

FIG. 4b is a detail view of the apparatus for effecting coupling and drive to the protracted wheel assemblies of FIG. 4a;

FIG. 5b is a detail view of the apparatus for effecting decoupling of drive from the retracted wheel assemblies of FIG. 5a.

DETAILED DESCRIPTION OF THE PREFERRED EMBODIMENTS

Figure 1:
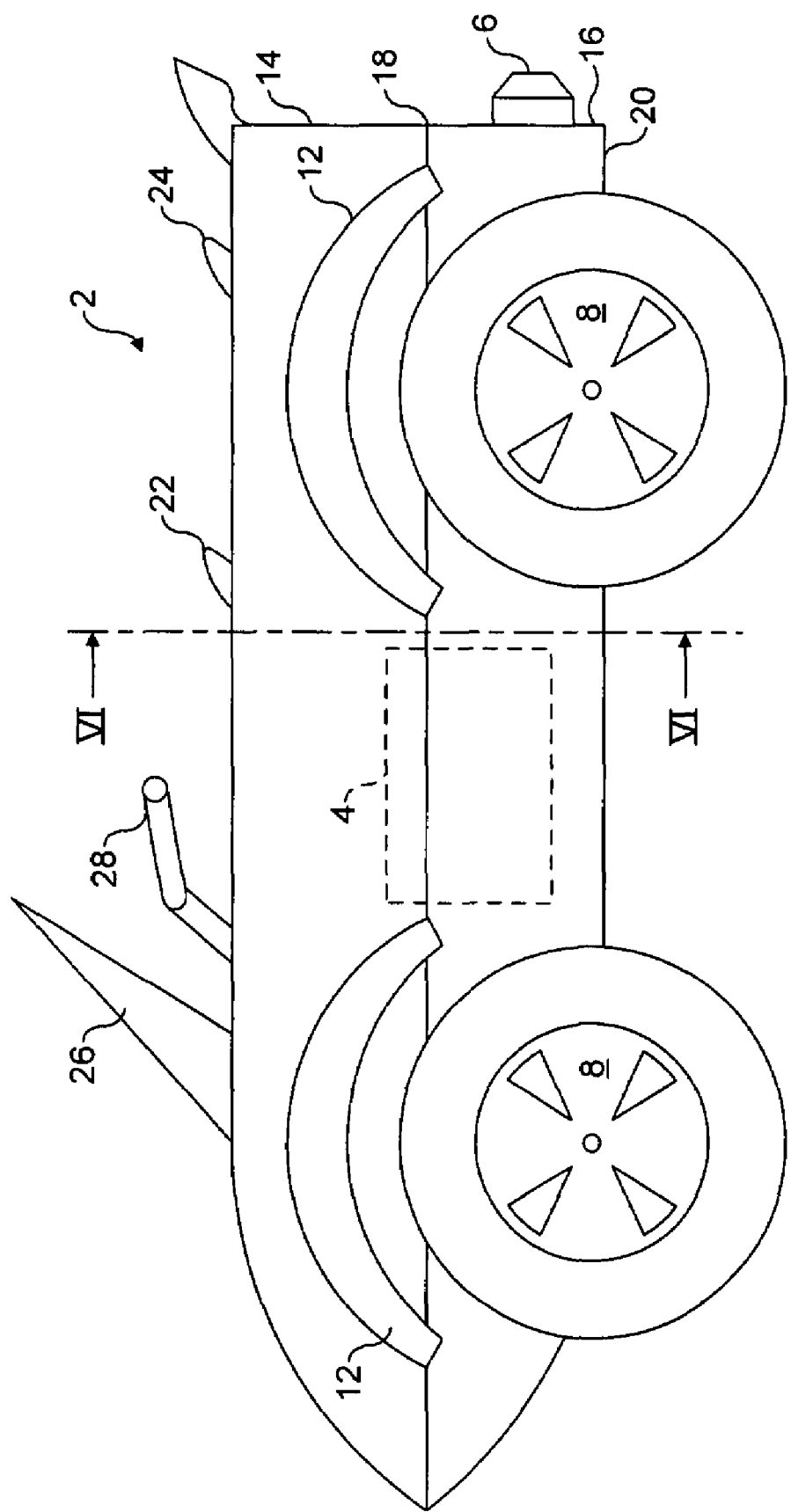
FIG. 1 is a schematic side elevation view of an amphibious vehicle according to the present invention.

As can be seen from FIG. 1, amphibious vehicle 2 has a prime mover 4 driving a jet drive 6 through a marine transmission, described below with reference to FIG. 2. Road traction is provided by wheels 8, which are driven through a road transmission. The wheels 8 are shielded by wheel arches 12. The vehicle body comprises an upper body 14 and a hull 16, which are formed separately and joined at split line 18. A chassis is also provided, as is described in further detail below. If this chassis is bonded to or otherwise attached to or integrated with the bodywork, it may be regarded as part of the overall body structure. The hull 16 has a planing surface 20. A driver's seat 22 is provided with one or more passenger seats 24 situated astern of the driver's seat 22. The seating axis is coincident with the longitudinal axis of the vehicle 2, or parallel thereto. The axis of the prime mover 4 is also coincident with, or parallel to, the longitudinal axis of the vehicle 2. Driver controls are provided, in this preferred embodiment by virtue of handlebars 28. A windscreen 26 is provided for weather and spray protection.

Figure 2:
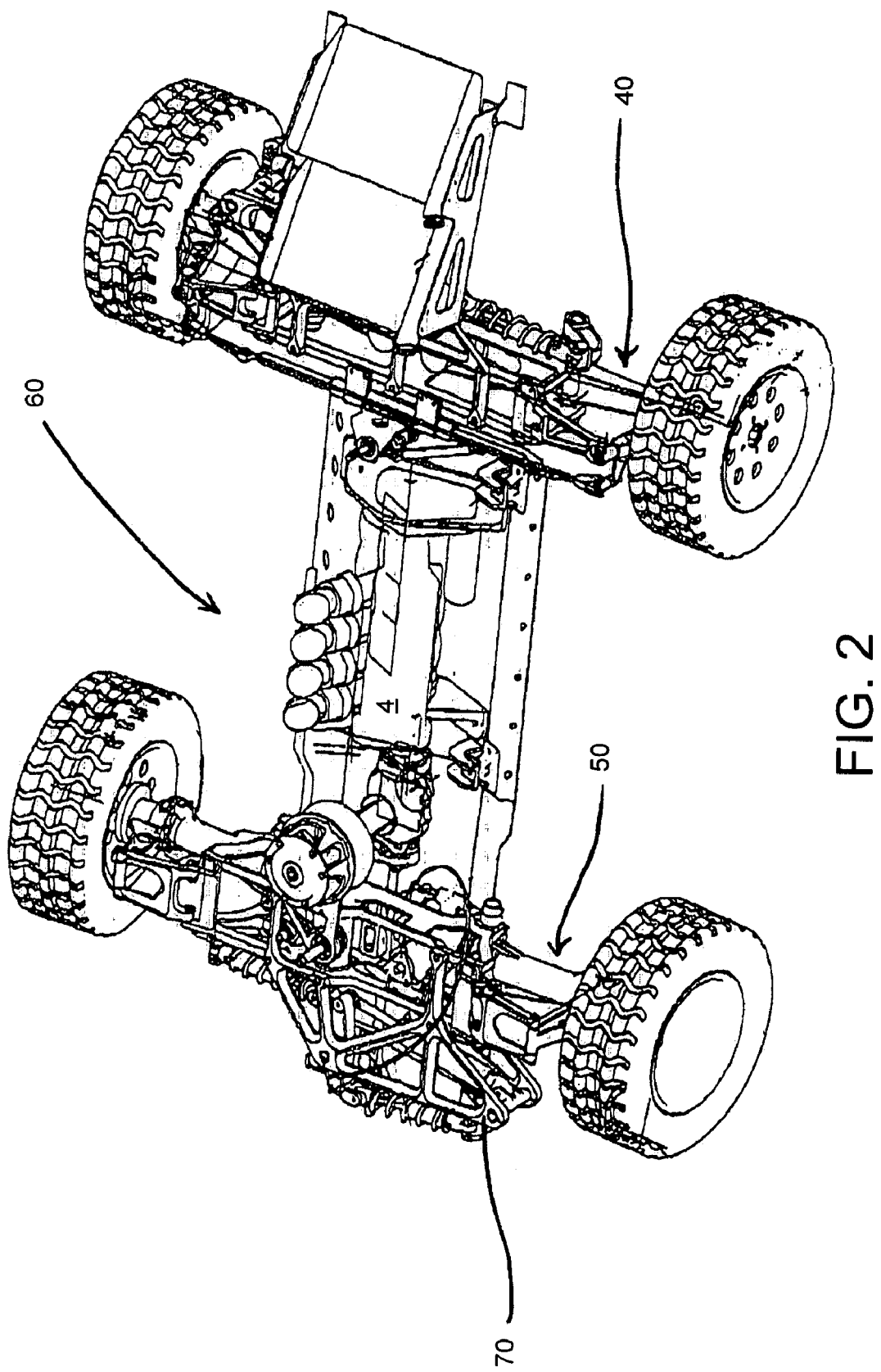
FIG. 2 is a perspective view from above and to one side of the vehicle of FIG. 1 with the upper body and hull removed.

FIG. 2 illustrates a perspective view of the vehicle rolling chassis 60 in isolation. A front, steered, axle 40 can be seen to the right; and a rear, powered, non-steered axle 50 to the left. The prime mover 4 may also be seen, mounted longitudinally, and substantially centrally in the vehicle. Numeral 70 denotes a support frame, which will be further described later.

Figure 3:
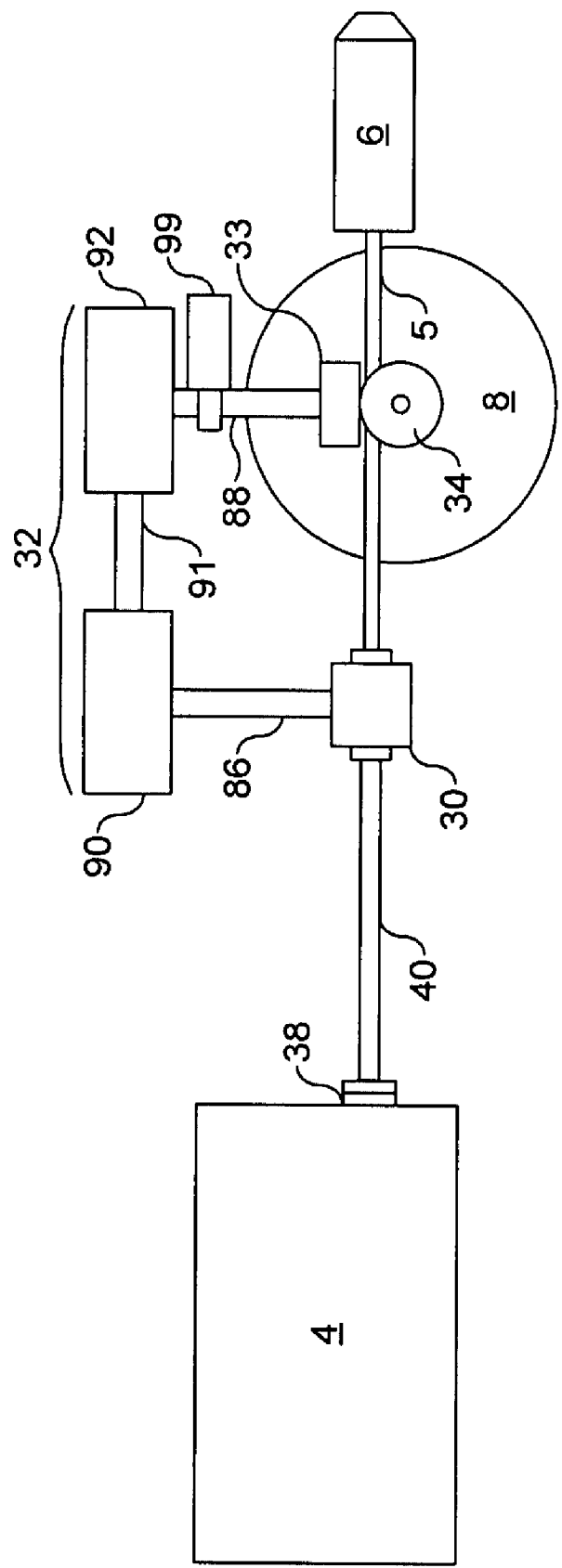
FIG. 3 is a schematic side elevation view of a power train arrangement of the vehicle of FIG. 1.
Figure 4A:
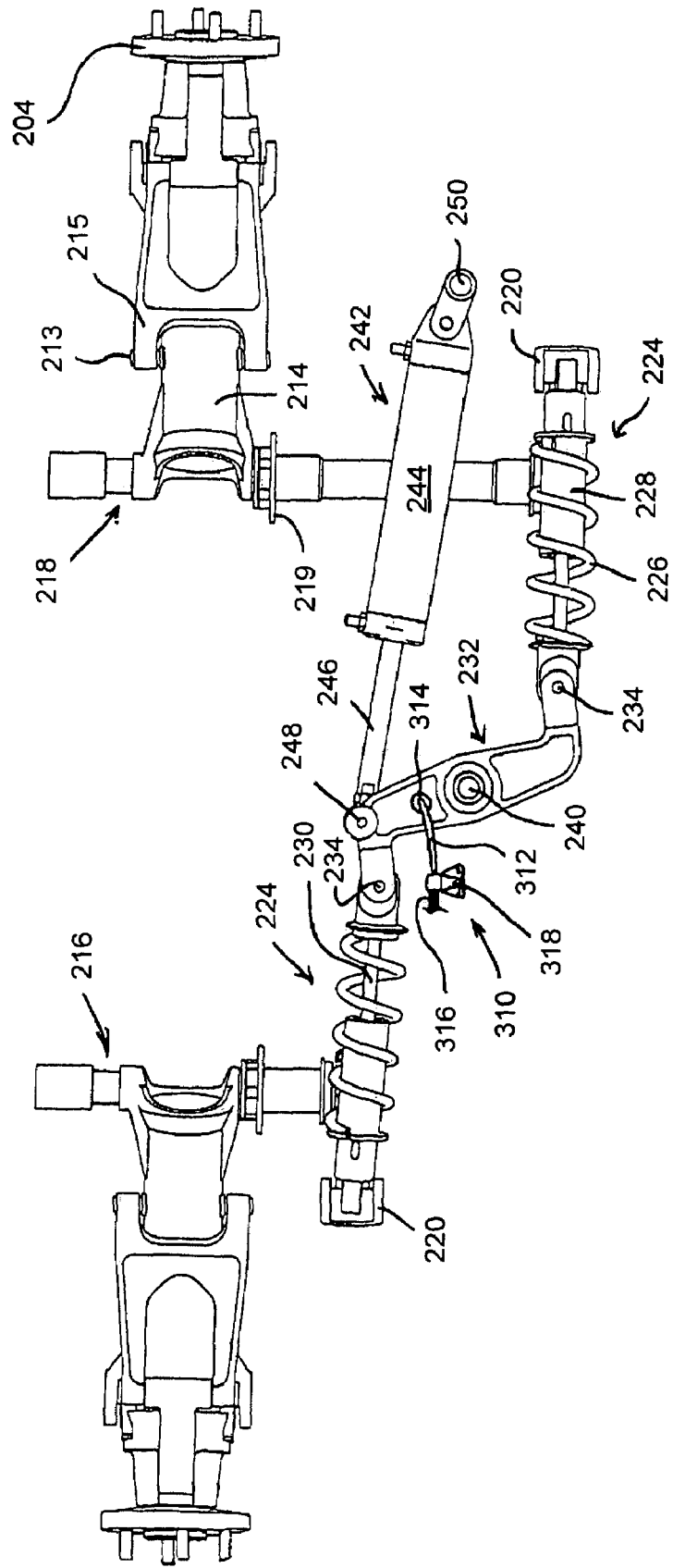
FIG. 4a is a plan view from above of a retractable suspension system for an axle of the vehicle of FIG. 1, with the wheel assemblies protracted.

FIG. 3 is a schematic representation of essential integers of the power train of the vehicle of FIG. 1. Prime mover 4 has a crankshaft 38, coupled fixedly to a first driveshaft 40. Driveshaft 40 is in turn connected to and provides drive to a transfer case 30. Marine driveshaft 5 is also connected to and is driven by the transfer case 30, to provide power to marine drive means 6, which preferably takes the form of a jet drive. The transfer case 30 may incorporate a decoupler or a fixed ratio change for the marine drive 6. A reverse gear may also be provided here for the marine drive 6, to allow for manoeuvring, or for clearance of weed or other debris, etc., from inside the jet drive.

Transfer case 30 also provides a road transmission output along vertical output shaft 86. Bevel gears are used to transfer power from shaft 40 to shaft 86. The change speed transmission 32 is shown as a CVT (continuously variable transmission), comprising input pulley assembly 90, output pulley assembly 92, and a drive belt 91 connecting the two. The output from CVT 32 is taken down to differential 34 by vertical output shaft 88. The input to differential 34 is provided through a dog clutch 33. Numeral 99 denotes an electric motor, preferably a starter motor with attached Bendix drive. Such a drive may be used to provide a reverse gear where transfer case 30 does not provide such a facility.

FIGS. 4a, 4b, 5a, and 5b illustrate the retractable suspension assembly of one axle of the vehicle of FIG. 1 in isolation, to more clearly show how the present invention works. Retraction device 242, preferably a hydraulic cylinder 244 including a rod 246, is pivotally connected to the vehicle chassis (not shown) at mounting point 250. This mounting point may be on a support frame, such as item 70 in FIG. 2. The distal end of rod 246 is fixed to a pivot 248, to which there is also fixed a rocker arm 232, with a central pivot 240. Each end of rocker arm 232 has a pivot 234, to which is connected a wheel suspension assembly 224, comprising a coil spring 226 and a telescopic damper 228 with a push rod 230. A push-pull cable assembly 310, comprising an outer cable 316 and an inner cable 312, is fixed to the vehicle chassis at mounting 318; and to the rocker arm 232 at mounting point 314. The distal end of each suspension assembly 224 is pivotably linked to a link arm 220. These link arms 220 are in turn linked to respective torsion tubes 216, 218. The link arms 220 and torsion tubes 216, 218 are mounted longitudinally in the vehicle 2; similar members 216', 218' can be seen from another perspective in FIG. 7.

For a driven axle, as shown, torsion tubes 216, 218 are fixed to lower suspension arms 214 which enclose driveshafts (not shown). Upper suspension members 215 are also provided, mounted to be swingable about inner pivots 213. Wheel hubs 204 are mounted to the distal ends of lower suspension arms 214.

Figure 5A:
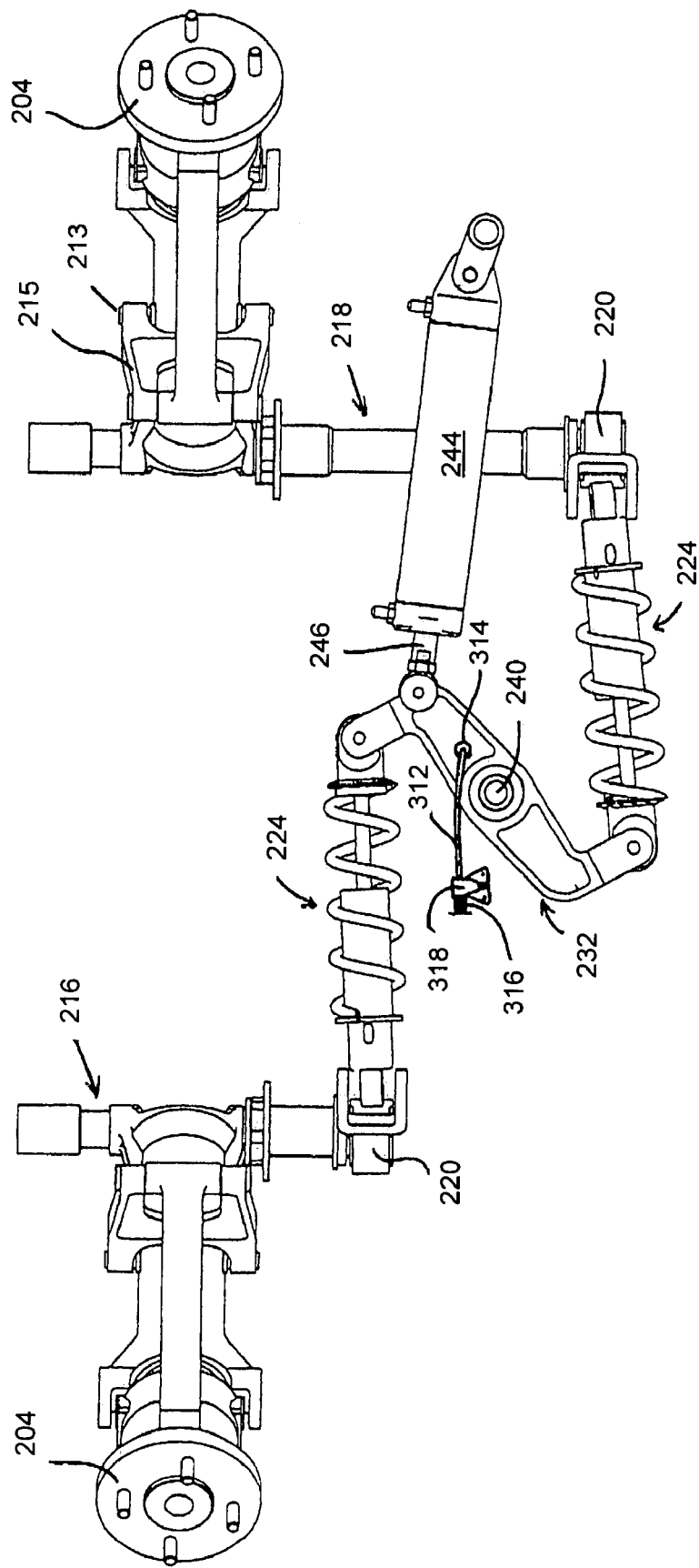
FIG. 5a is a plan view from above of a retractable suspension system for an axle of the vehicle of FIG. 1, with the wheel assemblies retracted.
Figure 5B:
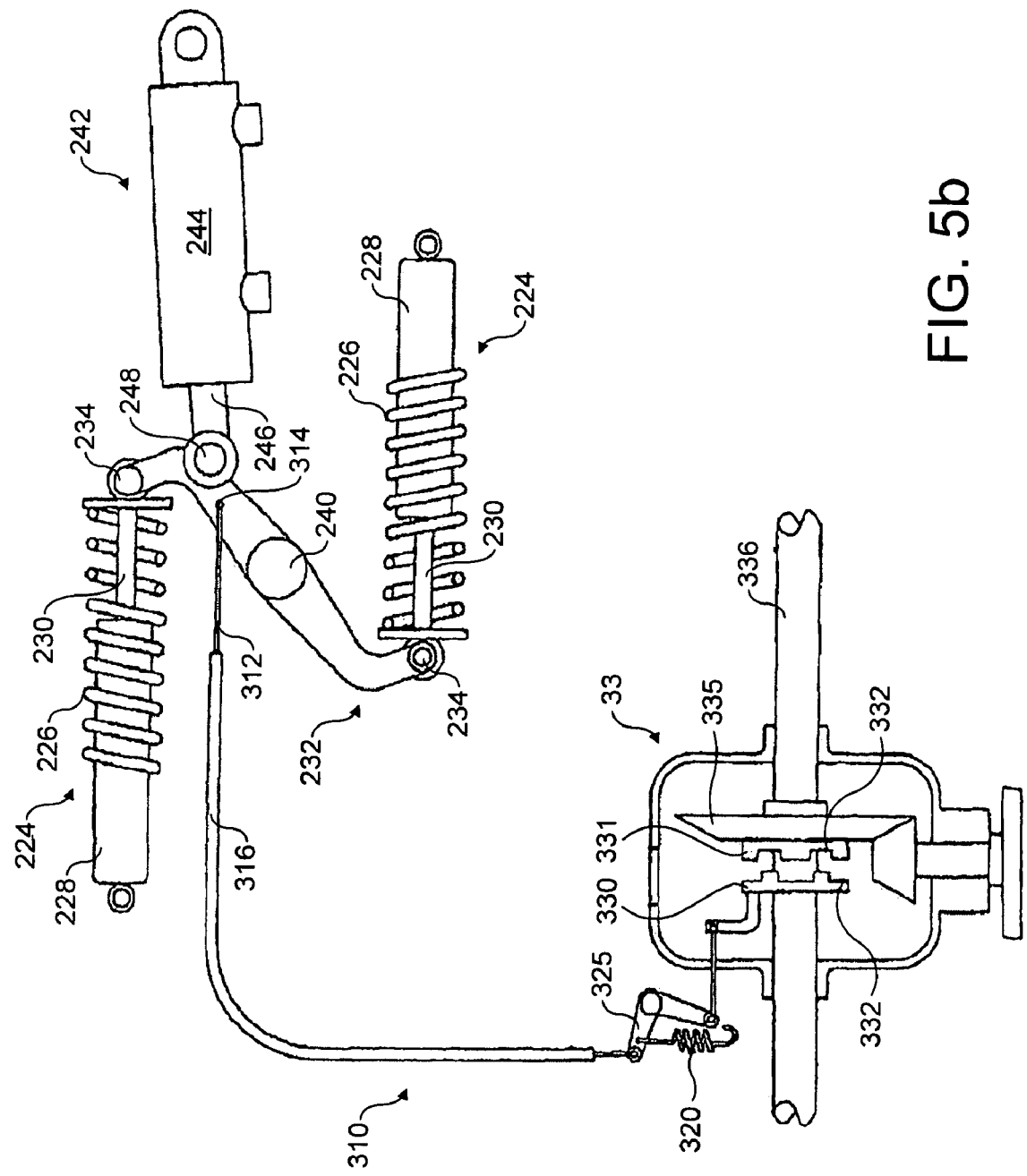

As can be seen in FIG. 5a, when ram 244 is retracted, its rod 246 is retracted into the cylinder of ram 244. Rocker arm 232 is therefore rotated (clockwise, as shown) about pivot 240. This pulls suspension assemblies 224 in towards the centre of the vehicle 2, rotating link arms 220 and torsion tubes 216 and 218. This in turn pulls lower suspension arms 214 upwards. Wheel hubs 204 are thus also rotated upwards, raising the road wheels (not shown) clear of the surface of the water, even when the vehicle 2 is banked in turns when the vehicle 2 is operated over water. It can also be seen from FIG. 5a, that the geometry of this system is such that upper suspension members 215 fold up beyond a vertical position, so that their inboard ends are now inboard of pivots 213.

As this wheel assembly retraction process takes place, it can be seen through comparison of FIGS. 4a, 4b and 5a, 5b that inner cable 312 is pulled through the outer cable 316 (which is fixed in position at mounting 318). As can best be seen from FIG. 5b, this in turn allows cable assembly 310 to disengage dog clutch 33 (located above differential 34), thus achieving the object of automatically disconnecting road drive to wheels 8 as said wheel assemblies are retracted by the retractable suspension. The reverse process will of course also apply, so that road drive is automatically reconnected as said wheel assemblies are protracted, from the FIGS. 5a, 5b situation to that shown in FIGS. 4a, 4b. A spring 320 (shown in FIGS. 4b, 5b) may be fitted to cable assembly 310 as a safeguard, to ensure a failsafe condition (if the cable snaps) in which the clutch 33 is closed. Also the spring 320 acts to keep the cable 312 in tension; the clutch 33 is opened against a biasing force applied by the spring 320. The spring stores energy which is subsequently used to shut the clutch 33 when the movement of rotor 232 allows the cable to slide to permit rotation of arm 325.

The term "dog clutch" is often used in the art to describe a sprag engaging on a ratchet type wheel. Such a clutch has the known weakness of only being able to transmit power in a single rotational direction; any attempt to transmit power in the reverse direction will simply snap the sprag clutch arm. As can be seen from FIGS. 4b and 5b, however, the dog clutch 33 used in the present invention has two gear wheels 330, 331 each provided with teeth 332 of substantially square profile; and can therefore transmit power equally well in both directions. Furthermore, the bevel gear 335 shown engaging and disengaging with the dog clutch 33 must be free to rotate on the horizontal shaft 336. Were it to be keyed to shaft 336, drive to the road wheels would be permanently engaged. On the other hand, the dog clutch sliding gear 330 must be splined to the shaft 336. As can be seen from FIG. 4b, an arm 325 is used to relay the motion of the dog clutch end of cable assembly 310.

Figure 6:
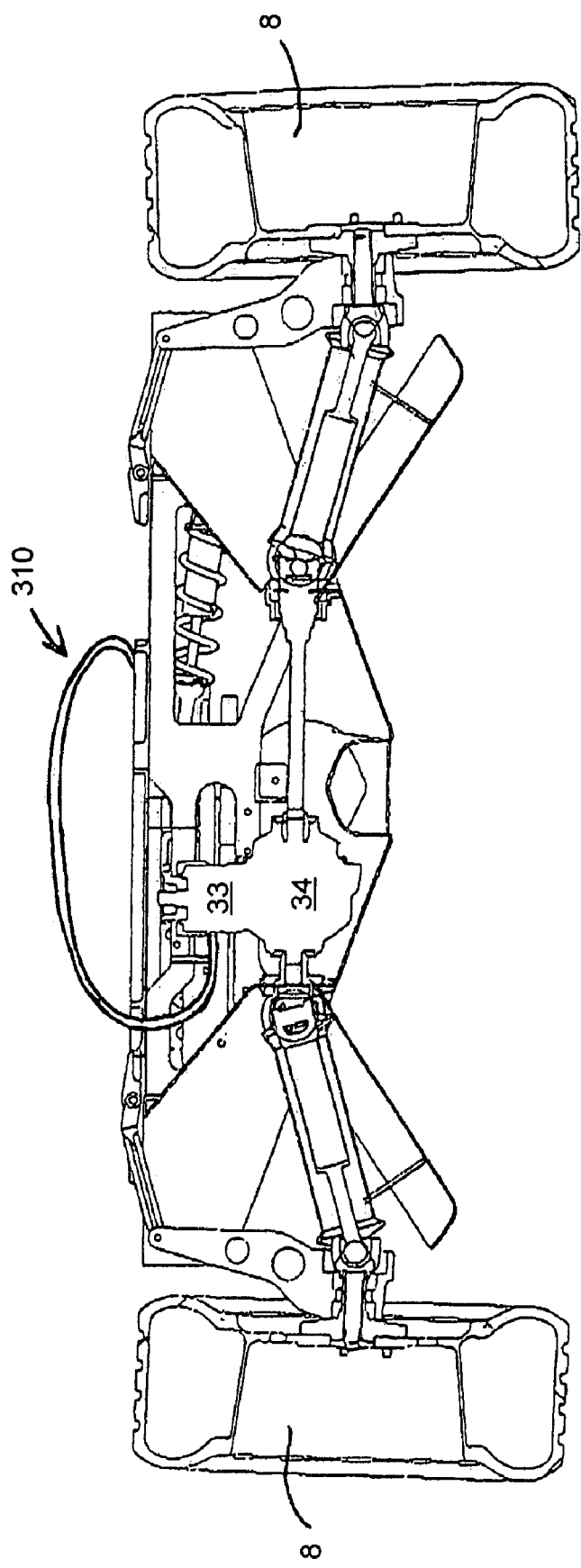
FIG. 6 is a transverse elevation view along plane VI-VI in FIG. 1, of a rear axle of the vehicle of FIG. 1.

FIG. 6 shows a view from in front of the rear axle of the vehicle of FIG. 1, to illustrate the spatial relationship of cable assembly 310, dog clutch 33, and differential 34.

It will be appreciated that further modifications to the transmission layout described above may be made as required without departing from the scope of the invention. For example, other suspension retraction mechanisms may pull the push-pull cable equally well (e.g. directly acting hydraulic or pneumatic cylinder(s), electric motor(s) or linkage mechanism(s). A dog clutch could be applied to one or both differential output shafts, rather than to the input shaft; the entire arrangement could also be applied to an axle which is both powered and steered. Furthermore, rather than the lower suspension members being tubular, they may be solid, or may take the form of wishbones.

While a particular form of the present invention has been illustrated and described, it will be apparent to those skilled in the art that various modifications can be made without departing from the spirit and the scope of the present invention. Accordingly, it is not intended that the invention be limited except by the appended claims.

What is claimed is:

1. An amphibious vehicle, comprising:
   a prime mover;
   land propulsion means;
   marine propulsion means;
   transmission means for transmitting power generated by the prime mover to the land and/or marine propulsion means; and
   retractable suspension means capable of retracting and protracting the land propulsion means, wherein:
   the suspension means and the transmission means are directly interlinked such that retraction of said land propulsion means by said suspension means actuates the transmission means to decouple the prime mover from the land propulsion means and protraction of said land propulsion means by said suspension means actuates the transmission means to couple the prime mover with the land propulsion means, wherein the transmission means is mechanically connected to the retractable suspension means and the automatic coupling and decoupling of the land propulsion means is effected by physical movement of the retractable suspension means and wherein the mechanical connection between the transmission means and the retractable suspension means is a push-pull cable.

2. An amphibious vehicle, comprising:
a prime mover;
land propulsion means;
marine propulsion means;
transmission means for transmitting power generated by the prime mover to the land and/or marine propulsion means; and
retractable suspension means capable of retracting and protracting the land propulsion means, wherein:
the suspension means and the transmission means are directly interlinked such that the retraction of said land propulsion means by said suspension means actuates the transmission means to decouple the prime mover from the land propulsion means and protraction of said land propulsion means by said suspension means actuates the transmission means to couple the prime mover with the land propulsion means, wherein the transmission means is mechanically connected to the retractable suspension means and the automatic coupling and decoupling of the land propulsion means is effected by physical movement of the retractable suspension means and wherein the transmission means further comprises a spring return means.

3. An amphibious vehicle, comprising:
a prime mover;
land propulsion means;
marine propulsion means;
transmission means for transmitting power generated by the prime mover to the land and/or marine propulsion means; and
retractable suspension means capable of retracting and protracting the land propulsion means, wherein:
the suspension means and the transmission means are directly interlinked such that the retraction of said land propulsion means by said suspension means actuates the transmission means to decouple the prime mover from the land propulsion means, wherein the transmission means comprises a dog clutch to effect coupling and decoupling of the land propulsion means and further comprises a spring return means which acts on the dog clutch to bias the clutch closed.

4. An amphibious vehicle, comprising:
a prime mover;
land propulsion means;
marine propulsion means;
a transmission for transmitting power generated from the prime mover to the land and/or marine propulsion means; and
a retractable suspension capable of retracting and protracting the land propulsion means, wherein:
the suspension and the transmission means are directly interlinked such that retraction of said land propulsion means by said suspension actuates the transmission means to decouple the prime mover from the land propulsion means and protraction of said land propulsion means by the suspension actuates the transmission means to couple the prime mover to land propulsion means and wherein coupling and decoupling of the land propulsion means is effected by physical movement of the retractable suspension, wherein the transmission and the retractable suspension are interlinked by a push-pull cable.

5. An amphibious vehicle, comprising:
a prime mover;
land propulsion means;
marine propulsion means;
a transmission for transmitting power generated from the prime mover to the land and/or marine propulsion means; and
a retractable suspension capable of retracting and protracting the land propulsion means, wherein:
the suspension and the transmission means are directly interlinked such that retraction of said land propulsion means by said suspension actuates the transmission means to decouple the prime mover from the land propulsion means and protraction of said land propulsion means by the suspension actuates the transmission means to couple the prime mover to land propulsion means and wherein coupling and decoupling of the land propulsion means is effected by physical movement of the retractable suspension wherein the transmission comprises a dog clutch to effect coupling and decoupling of the land propulsion means and wherein the transmission further comprises a return spring which acts on the dog clutch to bias the clutch closed.

6. An amphibious vehicle, comprising:
a prime mover;
land propulsion means;
marine propulsion means;
a transmission for transmitting power generated by the prime mover to the land and/or marine propulsion means; and
a retractable suspension capable of retracting and protracting the land propulsion means, wherein:
the land propulsion means is automatically decoupled from the transmission when retracted by the retractable suspension means;
the land propulsion means is automatically coupled to the transmission when protracted by the retractable suspension means; and
the transmission comprises a clutch to effect coupling and decoupling of the land propulsion means and a return spring which acts on the clutch to bias the clutch closed.

* * * * *

UNITED STATES PATENT AND TRADEMARK OFFICE
CERTIFICATE OF CORRECTION

PATENT NO. : 7,410,396 B2
APPLICATION NO. : 11/255776
DATED : August 12, 2008
INVENTOR(S) : Simon James Longdill et al.

It is certified that error appears in the above-identified patent and that said Letters Patent is hereby corrected as shown below:

Column 5, line 36, after "spring return means" insert --which acts to bias the transmission means to couple the prime mover with the land propulsion means--.

Signed and Sealed this

Twenty-first Day of October, 2008

JON W. DUDAS
*Director of the United States Patent and Trademark Office*